(12) United States Patent
Kim et al.

(10) Patent No.: US 8,125,738 B2
(45) Date of Patent: Feb. 28, 2012

(54) ACTUATOR LATCH SYSTEM OF HARD DISK DRIVE INCLUDING LATCH LEVER HAVING FIRST AND SECOND HOOKS DISPOSED ONE ABOVE THE OTHER AT A LEADING END THEREOF

(75) Inventors: Yong-jae Kim, Seoul (KR); Min-pyo Hong, Suwon-si (KR); Kyung-ho Kim, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 689 days.

(21) Appl. No.: 12/203,242

(22) Filed: Sep. 3, 2008

(65) Prior Publication Data

US 2009/0059433 A1    Mar. 5, 2009

(30) Foreign Application Priority Data

Sep. 3, 2007   (KR) .................. 10-2007-0089147

(51) Int. Cl.
*G11B 5/54* (2006.01)

(52) U.S. Cl. ..................................... 360/256; 360/256.5

(58) Field of Classification Search .................. 360/256, 360/256.4, 256.5
See application file for complete search history.

(56) References Cited

U.S. PATENT DOCUMENTS

| 6,535,359 | B1 | 3/2003 | Boutaghou |
| 6,728,075 | B2 * | 4/2004 | Hong et al. ................. 360/256.4 |

FOREIGN PATENT DOCUMENTS

| JP | 2001-014815 | 1/2001 |
| JP | 2005-093003 | 4/2005 |
| JP | 2007-052880 | 3/2007 |

* cited by examiner

*Primary Examiner* — Allen Heinz
(74) *Attorney, Agent, or Firm* — Volentine & Whitt, PLLC

(57) ABSTRACT

An actuator latch system of a hard disk drive keeps an actuator of the hard disk drive in place in a state in which a read/write head mounted to a swing arm of the actuator is parked. The latch system has first and second protrusions at upper and lower parts of a rear end portion of the swing arm, and a latch lever having first and second hooks at upper and lower parts of a leading end of the lever. The latch lever, like the actuator, is mounted to a base of the hard disk drive so as to be rotatable about a respective axis.

20 Claims, 10 Drawing Sheets

ACTUATOR LATCH SYSTEM OF HARD DISK DRIVE INCLUDING LATCH LEVER HAVING FIRST AND SECOND HOOKS DISPOSED ONE ABOVE THE OTHER AT A LEADING END THEREOF

BACKGROUND OF THE INVENTION

1. Field of the Invention

The present invention relates to a hard disk drive. More particularly, the present invention relates to an actuator of a hard disk drive and to a latch system which locks the actuator in position, when the disk of the hard disk drive is stopped, to prevent the actuator from being rotated by an external force.

2. Description of the Related Art

A hard disk drive (HDD) is an information storage device which includes a disk having at least one recording surface, and a read/write head which writes data onto and reads data from the recording surface of the disk while the disk is being rotated. In this respect, the HDD also includes an actuator which moves the read/write head over the recording surface of the rotating disk so that the read/write head can access a desired portion (track) of the recording surface, e.g. a portion onto which data is to be recorded or from which data is to be retrieved.

When the HDD is not in use, that is, when the disk is not rotating, the read/write head is parked at a position away from the recording surface of the disk to prevent the read/write head from colliding against the recording surface of the disk. The parking systems for parking the read/write head include a contact start stop (CSS) type of parking system and a ramp loading type of parking system. In the CSS type of parking system, an inner circumferential part of the disk has a parking zone where no data is recorded, and the read/write head is parked in contact with the parking zone. In the ramp loading type of parking system, a ramp is disposed radially outwardly of the disk, and the actuator is moved onto the ramp to park the read/write head.

However, in either case, an external force applied to the HDD, e.g., an impact or vibrations, could move the actuator arbitrarily while the read/write head is parked. Thus, such an external force could move the read/write head onto the recording surface of the disk. As a result, the read/write head or the recording surface of the disk could be damaged. In view of such a potential problem, the actuator is "locked" when the read/write head is parked so that the read/write head will remain in the parking zone or adjacent the ramp even when an external force is applied to the HDD. A variety of known actuator latch systems are employed by HDDs for this purpose.

FIGS. 1A, 1B, and 1C illustrate an example of a conventional actuator latch system 20, known as a single lever type of inertial latch system, of an HDD. In this example, the HDD employs a ramp loading type of parking system having a ramp 15.

Referring to FIG. 1A, an actuator 10 for moving a read/write head (not shown) to a desired position over a disk (also not shown) includes a swing arm 12 supported by a pivot 11 so as to be rotatable about an axis, and a suspension 13 disposed at an end portion of the swing arm 12. The suspension 13 supports a slider 14 to which the read/write head is mounted, and elastically biases the read/write head toward the recording surface of the disk. The inertial latch system 20 includes a latch lever 21 supported so as to be freely rotatable about an axis parallel to that about which the swing arm 12 is rotated, a crash stop 24 limiting the clockwise rotation of the swing arm 12, and a latch stop 25 limiting the clockwise rotation of the latch lever 21. The latch lever 21 has a latch hook 22 at a leading end portion thereof. The swing arm 12, on the other hand, defines a notch 23 in an end thereof that faces the latch lever 21.

FIG. 1B shows the case in which a shock applied to the HDD causes the swing arm 12 of the actuator 10 and the latch lever 21 to rotate counterclockwise due to their moments of inertia. Accordingly, the latch hook 22 is received in the notch 23 such that the swing arm 12 of the actuator 10 cannot rotate any further in the counterclockwise direction. In contrast, FIG. 1C shows the case in which a shock applied to the HDD causes the swing arm 12 of the actuator 10 and the latch lever 21 to rotate clockwise due to their moments of inertia. In this case, the swing arm 12 collides against the crash stop 24, rebounds, and thereby begins to rotate counterclockwise. The latch lever 21 collides against the latch stop 25, rebounds and thereby also rotates counterclockwise. Accordingly, the latch hook 22 is received in the notch 23 so that the actuator 10 is basically locked in place.

The conventional single lever type of inertia latch system 20 operates relatively reliably when the shock applied to the HDD causes the swing arm 12 of the actuator 10 to initially rotate counterclockwise. However, in the case in which shock applied to the HDD causes the actuator 10 and the latch lever to rotate clockwise and then rebound from the crash stop 24 and latch stop 25, respectively, the resulting counterclockwise rotation of the swing arm 12 may not be timed with that of the latch lever 21. That is, sometimes the latch hook 22 does not engage the swing arm 12.

Also, as described above, counterclockwise rotation of the swing arm 12 is normally limited by the engagement between the latch lever 21 and the swing arm 12 when the latch hook 22 is received in the notch. However, when the external shock which causes the swing arm 12 to rotate counterclockwise is relatively great, the latch hook 22 and the swing arm 12 collide with each other with such force that the swing arm 12 and the latch lever 21 rebound from each other. Accordingly, the swing arm 12 rotates clockwise, collides against the crash stop 24, rebounds and then starts rotating counterclockwise. In this case, the counterclockwise rotation of the swing arm 12 is often not limited by the latch hook 22, due to a mismatch in the timing of the latch system as described above.

Therefore, the swing arm 12 continues to rotate counterclockwise, and the read/write head moves off of the ramp 15 and onto the recording surface of the disk. Accordingly, the read/write head or the recording surface of the disk may be damaged.

FIGS. 2A, 2B, and 2C illustrate a dual lever type of inertia latch system 40 that was developed to overcome the above-described problems of the conventional single lever type of inertia latch system 20. Reference numeral 30 designates the actuator of the HDD, and reference numeral 32 designates the swing arm 32 of the actuator 30.

Referring to FIG. 2A, the inertia latch system 40 includes two latch levers 41 and 42 each supported so as to be freely rotatable about a respective axis, and a crash stop 46 limiting the clockwise rotation of the swing arm 32. Also, the first latch lever 41 has a latch pin 43, whereas the second latch lever 42 has a latch hook 44. The swing arm 32 of the actuator 30 defines a notch 45 at an end thereof which faces the second latch lever 42.

FIG. 2B shows the case in which shock applied to the HDD causes the swing arm 32 of the actuator 30 and the first and second latch levers 41 and 42 to rotate counterclockwise due to their moments of inertia. Accordingly, the swing arm 32 of the actuator 30 is caught by the second latch lever 42, i.e., the latch hook 44 is received in the notch 45, whereupon the swing arm 32 cannot rotate any further in the counterclockwise direction. In contrast, FIG. 2C shows the case in which shock applied to the HDD causes the swing arm 32 of the actuator 30 and the first latch lever 41 to rotate clockwise due to their moments of inertia. The swing arm 32 then collides with the crash stop 46, rebounds and thereby starts rotating counterclockwise. At the same time, the clockwise rotation of the first latch lever 41 causes the latch pin 43 to engage the second latch lever 42 and thereby cause the second latch lever 42 to rotate counterclockwise. As a result, the latch hook 44 is received in the notch 45 such that the second latch lever 42 engages the swing arm 32. Accordingly, the swing arm 32 is prevented from rotating further in the counterclockwise direction.

The conventional dual lever type of inertia latch system 40 operates reliably with respect to shock applied to the HDD which creates a moment acting on the swing arm 32 in either a clockwise or counterclockwise direction. However, the dual lever type of inertia latch system 40 is complex and requires a relatively large amount of space. Accordingly, the dual lever type of inertia latch system 40 is costly to fabricate and assemble, and is difficult to provide in a compact mobile disk drive.

SUMMARY OF THE INVENTION

An object of the present invention is to solve the above-described problems, draw-backs and limitations of the prior art.

A more specific object of the present invention is to provide a reliable actuator latch system in a hard disk drive.

Another object of the present invention is to provide a reliable actuator latch system in a hard disk drive, and which system is simple and therefore easy to fabricate and install.

According to one aspect of the present invention, there is provided in a hard disk drive an actuator latch system made up of two protrusions projecting from a rear end of the swing arm of the actuator, and a latch lever having two hooks at a leading end thereof. The latch lever, like the swing arm, is supported so as to be rotatable about a respective axis. The protrusions projecting from the swing arm are associated with hooks of the latch lever, respectively. In particular, The first hook engages the first protrusion of the swing arm when the arm is inadvertently rotated in a first direction to arrest such inadvertent rotation, and the second hook engages the second protrusion of the swing arm when the arm rotates for a second time in the first direction due to rebounding that occurs in the latch system after the first protrusion and the first hook collide.

The distance between the second protrusion and the second hook is greater than the distance between the first protrusion and the first hook. Also, the distance between the second hook and the axis of rotation of the swing arm is shorter than the distance between the first hook and the axis of rotation of the swing arm. In this respect, the term "the distance" refers to the shortest straight line distance, i.e., approximately the distance that the respective protrusion will travel before colliding with the associated hook of the latch lever.

Preferably, the first protrusion protrudes horizontally from a side surface of the rear end portion of the swing arm, and the first hook protrudes from a bottom surface of the latch lever. The first protrusion may be substantially triangular. On the other hand, the second protrusion preferably protrudes from an upper surface of the rear end portion of the swing arm, and the second hook extends horizontally at the most distal part of the leading end of the latch lever. The second protrusion may project beyond the side surface of the rear end portion of the swing arm.

Also, the first hook is disposed at the same level as the first protrusion, and the second hook is disposed at the same level as the second protrusion. More specifically, the first hook and the first protrusion are both disposed in a first plane perpendicular to the first and second axes of rotation. Thus, the first hook and the first protrusion both move in the first plane as the swing arm and the latch lever rotate about their respective axes of rotation. The second hook and the second protrusion are both disposed in a second plane parallel to the first plane. Thus, the second hook and the second protrusion both move in the second plane as the swing arm and the latch lever rotate about their respective axes of rotation.

The latch system may also include a first iron core carried by the rear end portion of the swing arm. The first iron core is attracted to a magnet of a voice coil motor of the hard disk drive to apply torque to the swing arm in a second direction that is opposite to the first direction.

The latch lever also has a counterbalance at a rear end portion of the latch lever. Preferably, the counterbalance is engaged with the swing arm in the state in which the read/write head is parked. A second iron core is carried by the counterbalance of the latch lever. The second iron core is attracted to a magnet of a voice coil motor of the hard disk drive to apply torque to the latch lever in a second direction that is opposite to the first direction. The latch lever may also have a stopper protruding from the counterbalance toward a side wall of the base of the hard disk drive, and a buffer hole extending through the counterbalance. The stopper limits the rotation of the latch lever by colliding with the side wall of the base. The buffer hole absorbs shock caused by the collision between the stopper and the side wall of the base and deadens noise which would otherwise be produced by such a collision.

BRIEF DESCRIPTION OF THE DRAWINGS

The above and other objects, features and advantages of the present invention will become more apparent from the following detailed description of the preferred embodiments thereof made with reference to the attached drawings in which.

DETAILED DESCRIPTION OF THE PREFERRED EMBODIMENTS

Figure 1A:
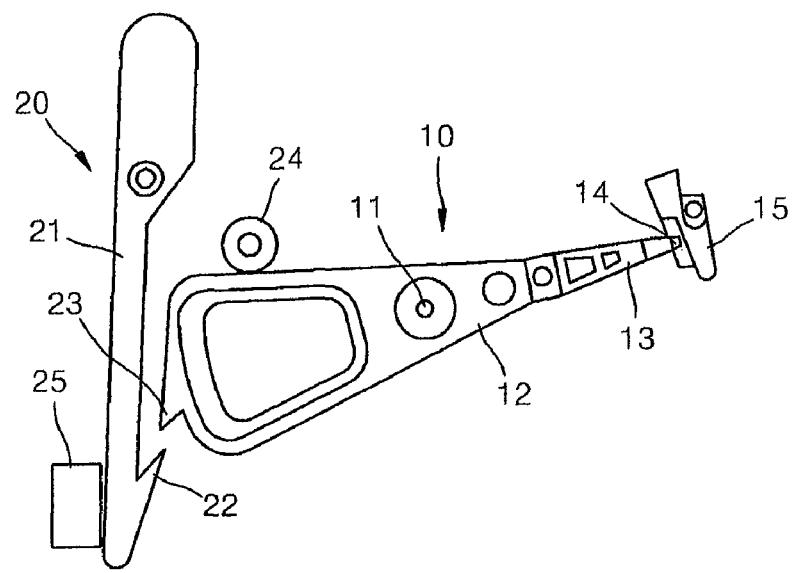
FIGS. 1A, 1B, and 1C are each a plan view of a conventional single lever type of inertia latch system of an HDD and together illustrate the operation of the latch system.
Figure 1B:
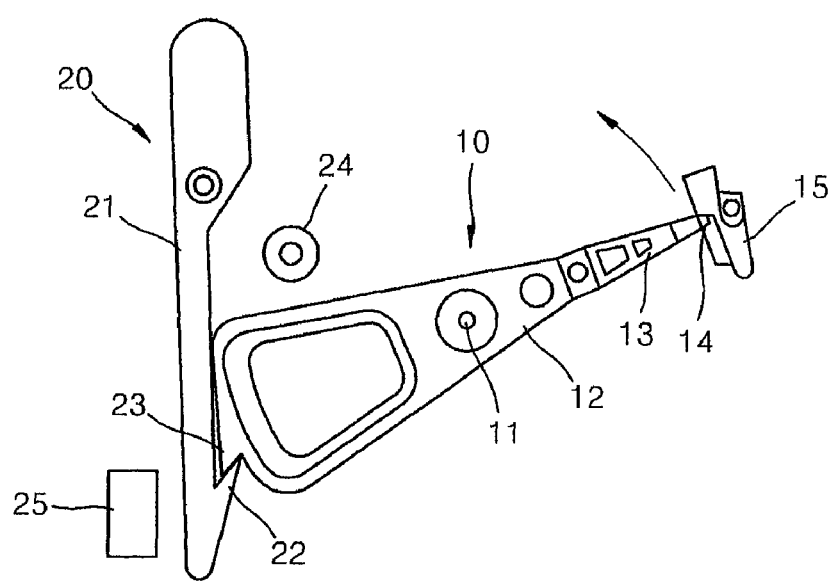
Figure 1C:
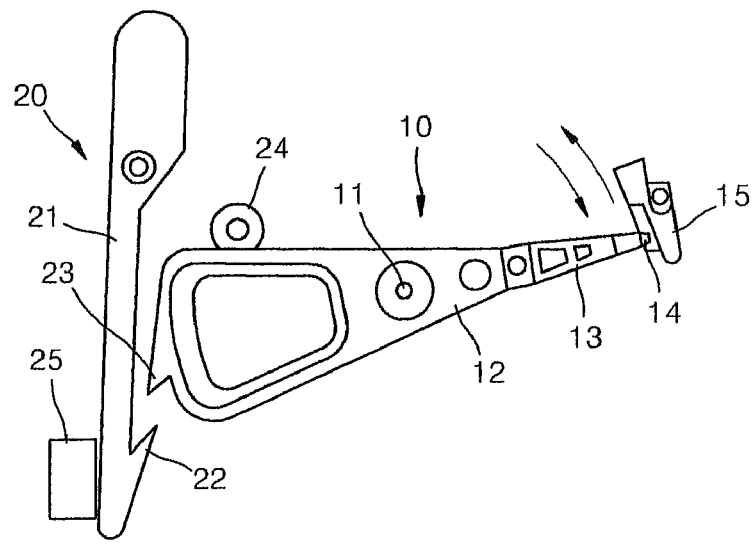
Figure 2A:
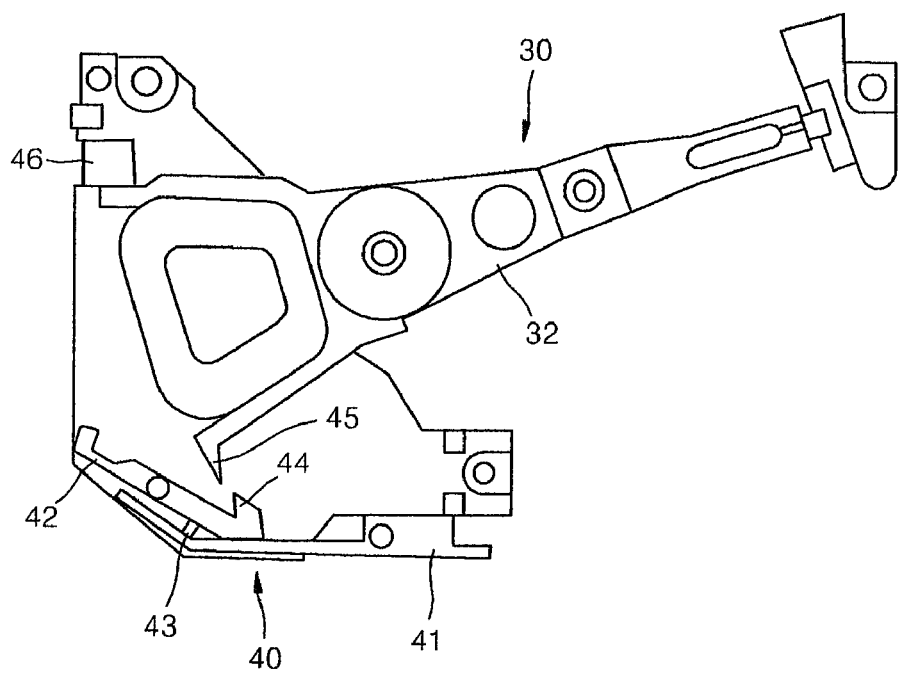
FIGS. 2A, 2B, and 2C are each a plan view of a conventional dual lever type of inertia latch system of an HDD and together illustrate the operation of the latch system.
Figure 2B:
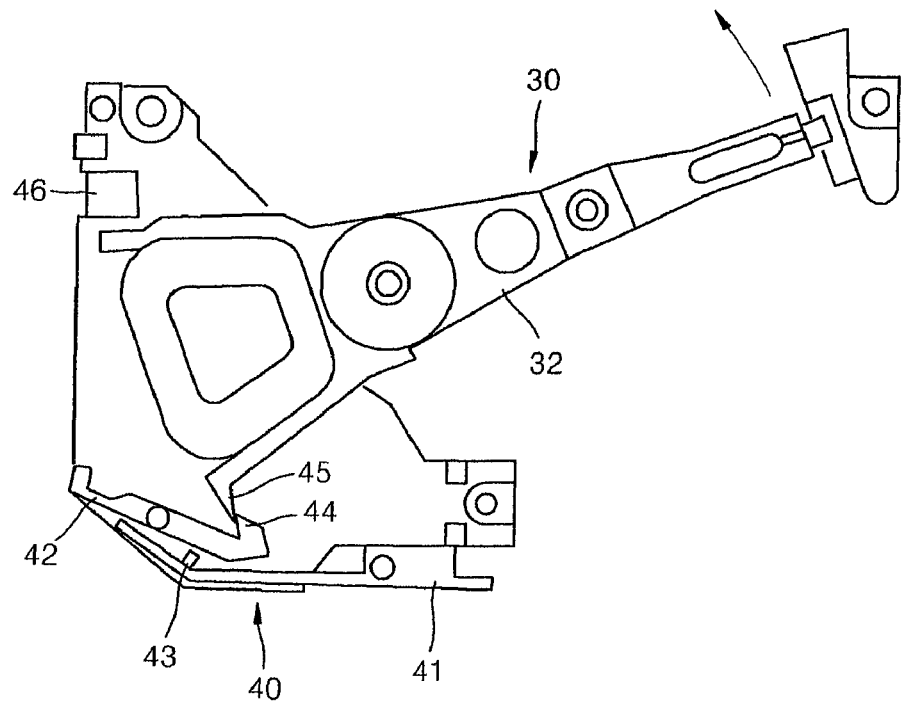
Figure 2C:
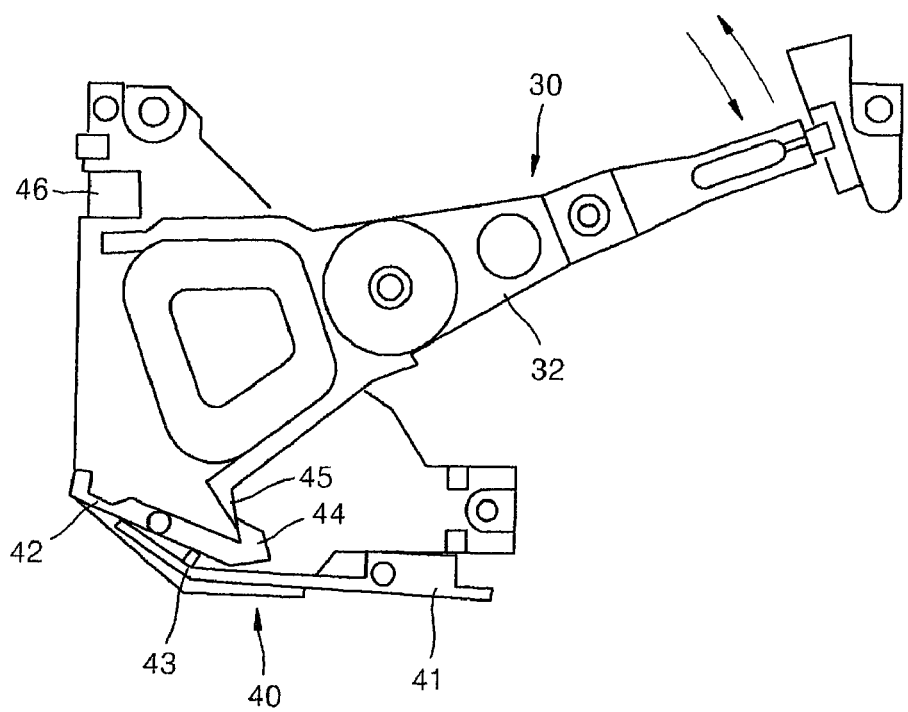
Figure 3:
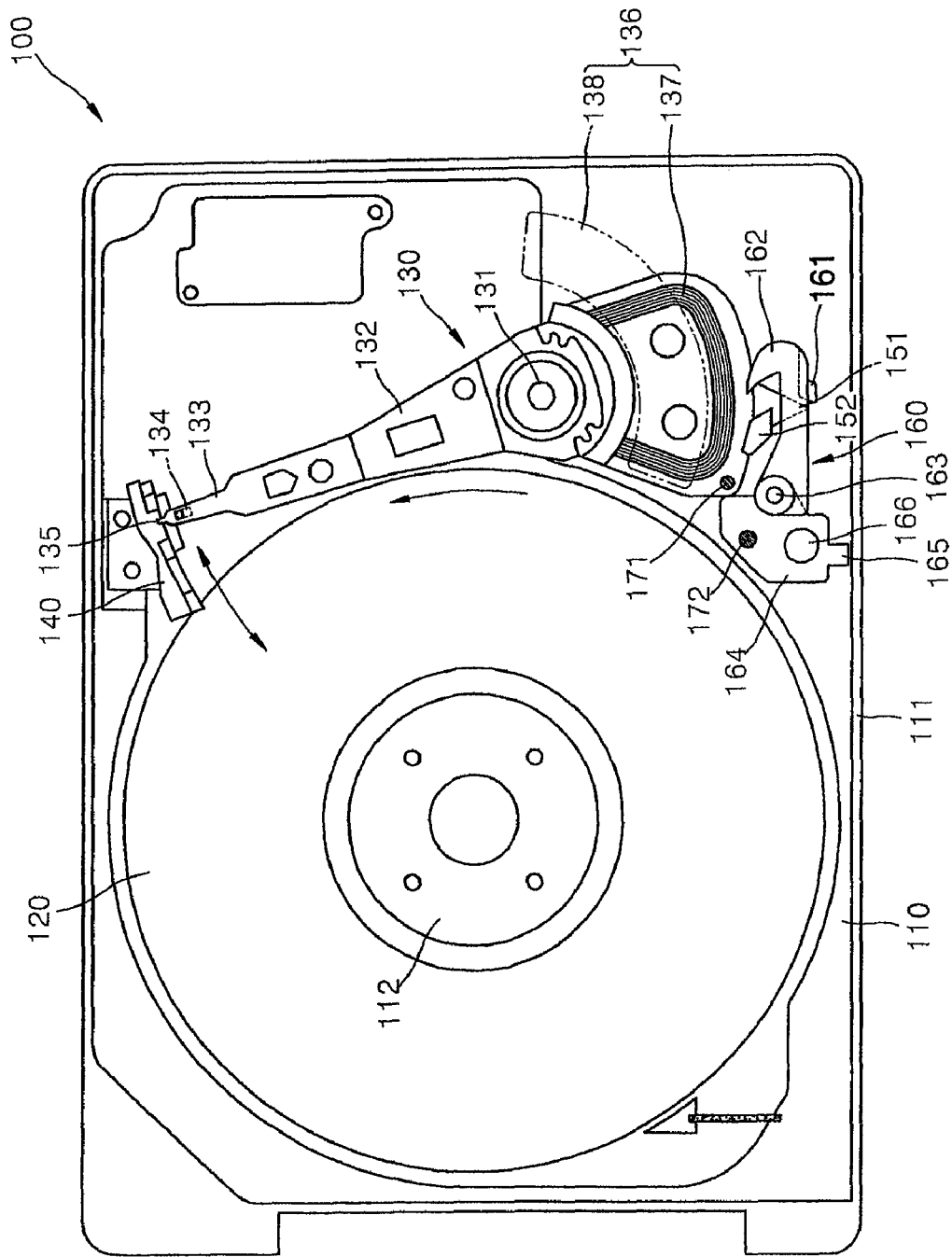
FIG. 3 is a plan view of a hard disk drive (HDD) having an actuator latch system according to the present invention.
Figure 4:
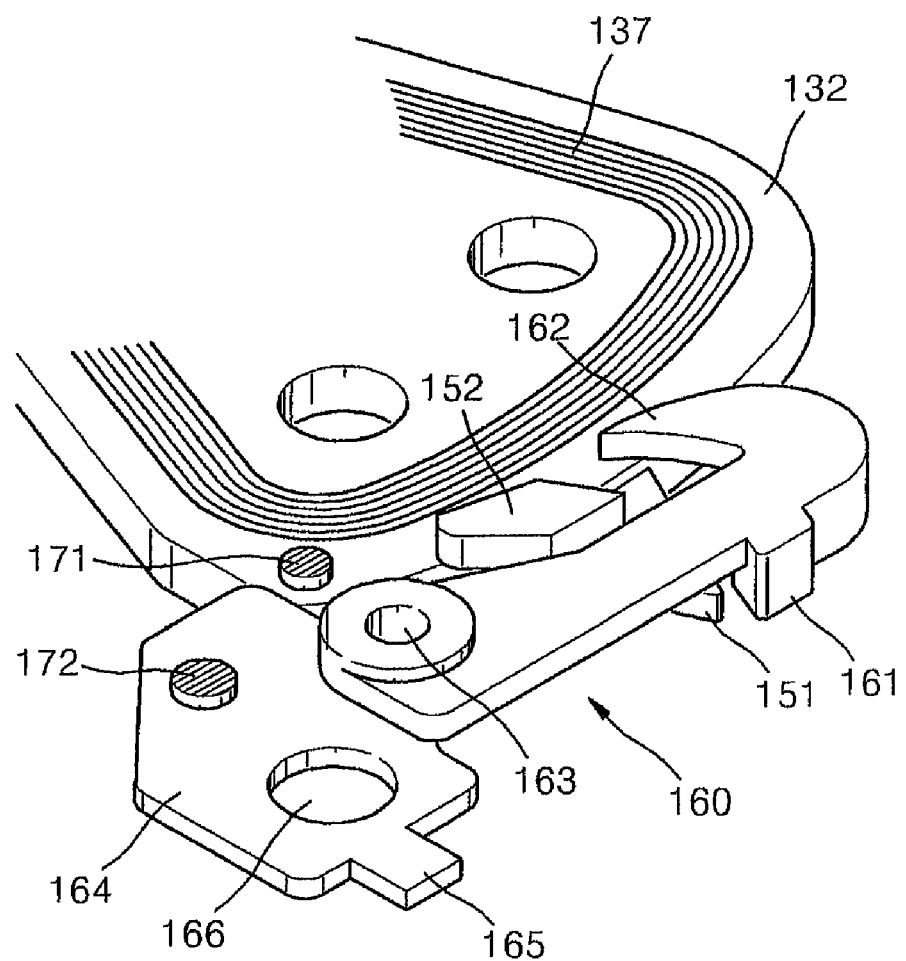
FIG. 4 is a perspective view of the actuator latch system of the HDD of FIG. 3.
Figure 5A:
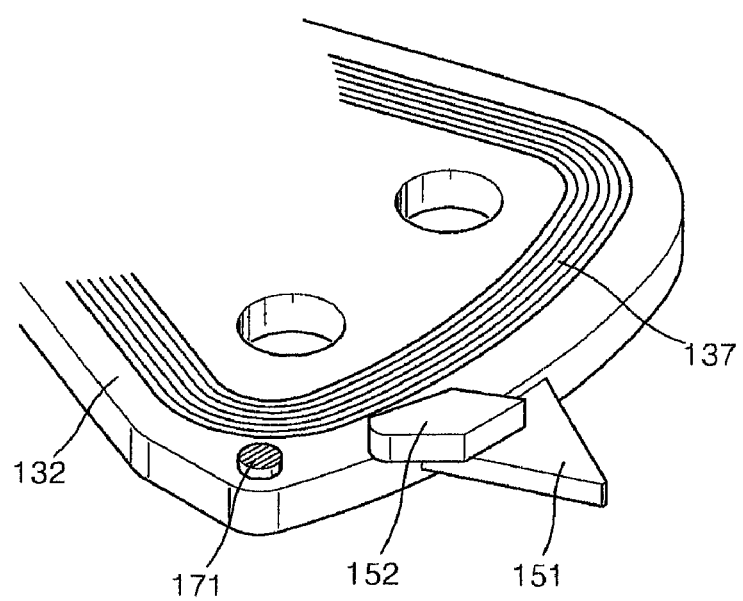
FIG. 5A is a perspective view of a portion of the swing arm of the HDD showing a first protrusion and a second protrusion at an end of the swing arm.
Figure 5B:
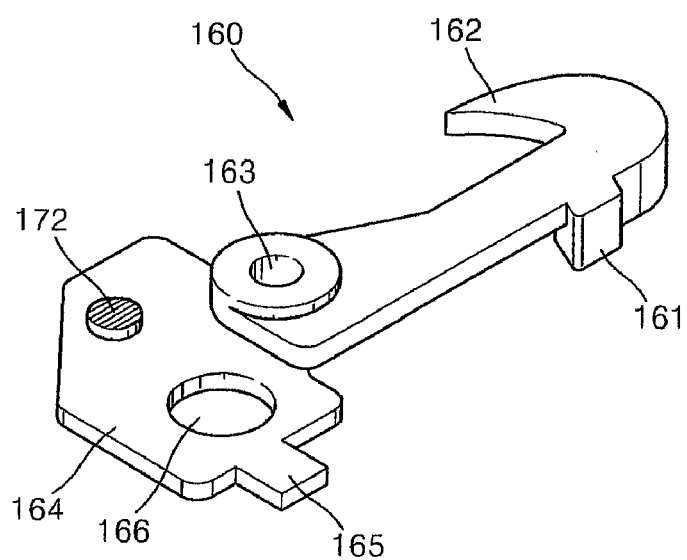
FIG. 5B is a perspective view of the latch lever of the actuator latch system according to the present invention.

Referring to FIGS. 3 through 5B, a hard disk drive HDD 100 according to the present invention includes a base 110, a spindle motor 112 mounted to the base 110, a disk 120 mounted to the spindle motor 112 so as to be rotated by the motor, and an actuator 130 for positioning the read/write head over the disk 120 so that the read/write head can record and/or reproduce data on/from desired portions of the disk. The actuator 130 includes a swing arm 132 supported on the base 110 of the HDD 100 by an actuator pivot 131 so as to be rotatable about an axis of the pivot 131, a suspension assembly 133 mounted to a lead end portion of the swing arm 132, and a voice coil motor (VCM) coil 137 disposed on a rear end portion of the swing arm 132. The suspension assembly 133 of the swing arm 132 supports a slider 134 having the read/write head mounted thereon, and elastically biases the read/write head toward the surface of the disk 120

The VCM coil 137 is part of a voice coil motor (VCM) 136 for rotating the swing arm 132 about the axis of the pivot 131. To this end, the VCM 136 also includes a VCM magnet 138 facing the VCM coil 137. In this respect, segments of the VCM magnet 138 can be disposed under and above the VCM coil 137, respectively, or the VCM magnet 138 can be provided only under or above the VCM coil 137. In any case, the VCM magnet 138 is fixed to a yoke.

Also, the VCM 136 is controlled by a servo control system and rotates the swing arm 132 in a direction according to Fleming's left hand rule, due to the interaction between current flowing through the VCM coil 137 and the magnetic field formed by the magnet 138. In particular, when the HDD 100 is turned on and the disk 120 starts to rotate, the VCM 136 rotates the swing arm 132 counterclockwise to move the read/write head over a recording surface of the disk 120. Conversely, when the power of the HDD 100 is turned off and the disk 120 is stopped, the VCM 136 rotates the swing arm 132 clockwise so that the read/write head is moved off of the disk 120, i.e., is parked.

The HDD also includes a ramp 140 disposed on the base 110 radially outwardly of the disk 120. The read/write head is parked using the ramp 140. More specifically, an end-tab 135 provided at the end of the suspension assembly 133 is moved onto the ramp 140 when the swing arm 132 is rotated clockwise by the VCM 136 to park the read/write head.

The HDD 100 also includes an actuator latch system for "locking" the actuator 130 when the read/write head is parked. In other words, the actuator latch system prevents the read/write head from moving away from the ramp 140 and onto the disk 120 when forces created by an external shock or vibrations are applied to the actuator 130 while the disk 120 is stopped. Therefore, the actuator latch system prevents the read/write head from contacting the surface of the disk 120 which contact could otherwise damage the surface of the disk 120 or the read/write head.

The actuator latch system includes two protrusions 151 and 152 extending from upper and lower parts of a rear end of the swing arm 132, respectively, and a latch lever 160 installed on the base 110 via a latch pivot 163 so as to be freely rotatable. The latch lever 160 has two hooks 161 and 162 at upper and lower parts of a leading (front) end thereof, respectively, and a counterbalance 164 at a trailing (rear) end thereof.

The rear end of a swing arm of an HDD is typically formed in a plastic injection mold and supports the VCM coil. Thus, the two protrusions 151 and 152 can be integrally formed at the rear end of the swing arm 132 by a plastic injection molding process. As mentioned above, the two protrusions 151 and 152 project at upper and lower parts of the rear end of the swing arm 132, respectively. More specifically, the first protrusion 151 protrudes horizontally from the side surface of the rear end portion of the swing arm 132 and is roughly triangular. The second protrusion 152 protrudes from the upper surface of the rear end portion of the swing arm 132. Part of the second protrusion 152 may also protrude beyond the outer peripheral edge of the rear end portion of the swing arm 152.

The first and second hooks 161 and 162 of the latch lever are positioned to interfere with the first and second protrusions 151 and 152, respectively, to facilitate the locking of the actuator 130. That is, the first hook 161 is disposed at the same level as the first protrusion 151 and the second hook 162 is disposed at the same level as the second protrusion 152. In this respect, the first hook 161 protrudes from a bottom surface of the latch lever 160 and the second hook 162 protrudes at the leading end of the latch lever 160.

However, the present invention is not so limited. For example, the first protrusion 151 can be disposed on the bottom surface of the rear end portion of the swing arm 132 and the second protrusion 152 can be disposed on the side or upper surface of the rear end portion of the swing arm 132. The first hook 161 can extend horizontally at the leading end portion of the latch lever 160 and the second hook 162 can protrude from the upper surface of the leading end portion of the latch lever 160.

Undesired counterclockwise rotation of the swing arm 132, i.e., a counterclockwise rotation of the swing arm 132 while the read/write head is parked, is prevented by the engagement between the first and second protrusions 151 and 152 with the first and second hooks 161 and 162 of the latch lever 160, respectively. This operation will be described in more detail later on. On the other hand, clockwise rotation of the swing arm 132 is restricted by the counterbalance 164 of the latch lever 160. More specifically, the counterbalance 164 contacts the rear end portion of the swing arm 132 when the read/write head is parked to prevent the swing arm 132 from rotating clockwise.

Also, the counterbalance 164 of the latch lever 160 includes a stopper 165 which protrudes horizontally toward a side wall 111 of the base 110. When the latch lever 160 rotates in the counterclockwise direction, the stopper 165 contacts the side wall 111 of the base member 110. Therefore, the stopper 165 serves to restrict the counterclockwise rotation of the latch lever 160. The counterbalance 164 also has a buffer hole 166 extending therethrough adjacent the stopper 165. The buffer hole 166 absorbs shock due to the collision between the stopper 165 of the counterbalance 164 and the side wall 111 of the base 110. Thus, the buffer hole 166 prevents the latch lever 160 from being damaged and prevents noise from being created when the stopper 165 collides with the side wall 111 of the base 110.

Furthermore, a first iron core 171 and a second iron core 172 are respectively disposed on the swing arm 132 and the latch lever 160. The first iron core 171 is formed of a magnetic body, preferably of an iron body that is ferromagnetic, so that a magnetic force acts between the magnet 138 and the first iron core 171. The magnetic force creates torque which urges the swing arm 132 to rotate in the clockwise direction. The torque is sufficient to lock the actuator 130 in place when relatively weak external shocks or vibrations are transmitted to the actuator 130 while the read/write head is parked.

The second iron core 172 is disposed on the counterbalance 164 of the latch lever 160. The second iron core 172 is formed of a magnetic body, preferably an iron body that is a ferromagnetic, so that a magnetic force acts between the magnet 138 and the second iron core 172. The magnetic force creates a torque which urges the latch lever 160 to rotate in the clockwise direction. The magnitude of the magnetic force applied to the first iron core 171 is greater than that of the magnetic force applied to the second iron core 172. Therefore, the magnitude of the torque applied to the swing arm 132 is greater than that of the torque applied to the latch lever 160. Thus, the magnet 138 and the first and second iron cores 171 and 172 maintain the actuator 130 in its locked state.

Figure 6:
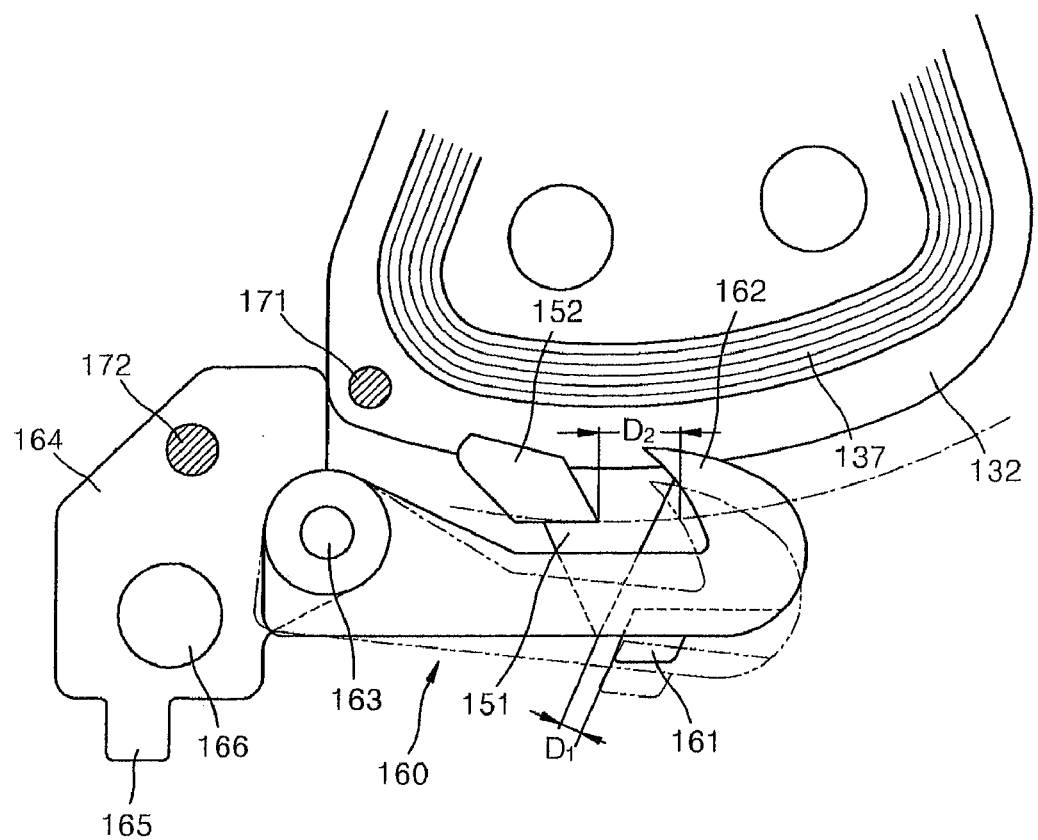
FIG. 6 is an enlarged plan view of the actuator latch system according to the present invention.

Referring now to FIG. 6, the first protrusion 151 and the first hook 161 of the latch lever 160 prevent the swing arm 132 from rotating in the counterclockwise direction when an external force is applied to the HDD while the read/write head is parked. In this respect, the first hook 161 of the latch lever 160 is disposed close to the first protrusion 151. That is, a first distance D1 between the first hook 161 and the first protrusion 151 is relatively small when the latch lever 160 is in a position at which the counterbalance 164 contacts the swing arm 132.

Therefore, when the swing arm 132 of the actuator 130 is rotated counterclockwise by an external force while the read/write head is parked, the first hook 161 and the first protrusion 151 contact each other in a short amount of time. Therefore, the arresting function of the latch lever system is reliably performed. Also, the amount of shock transferred to the latch lever 160 via the first protrusion 151 is correspondingly small. Accordingly, even though the swing arm 132 and the latch lever 160 rebound, their momentum is relatively small.

Nonetheless, even when a considerably heavy shock is applied to the HDD 100, the swing arm 132 rebounds from the counterbalance of the latch lever 160 such that the swing arm 132 rotates counterclockwise for a second time. In this case, the second protrusion 152 and the second hook of the latch lever 160 guarantee that the counterclockwise rotation of the swing arm 132 will be arrested. In this respect, the second hook 162 is positioned relatively far from the second protrusion 152 when the read/write head is parked. That is, a second distance D2 between the second hook 162 and the second protrusion 152 is greater than the first distance D1. The second hook 162 is located closer to the rotational axis of the swing arm 132, that is, the actuator pivot 131, than the first hook 161. In other words, when the read/write head of the actuator 130 is parked, the distance between the second hook 162 and the axis of rotation the swing arm 132 is shorter than the distance between the first hook 161 and the axis of rotation of the swing arm 132. Accordingly, as indicated by the chain lines of FIG. 6, even when the first hook 161 does not arrive in the path of the first protrusion 151, the second hook 162 is located in the path of the second protrusion 152. Thus, even if the first protrusion 151 is not caught by the first hook 161 as the swing arm 132 is rotating counterclockwise while the read/write head is parked, the second protrusion 152 will be caught by the second hook 162.

The operation of the actuator latch system according to the present invention will be described in even more detail below.

Figure 7:
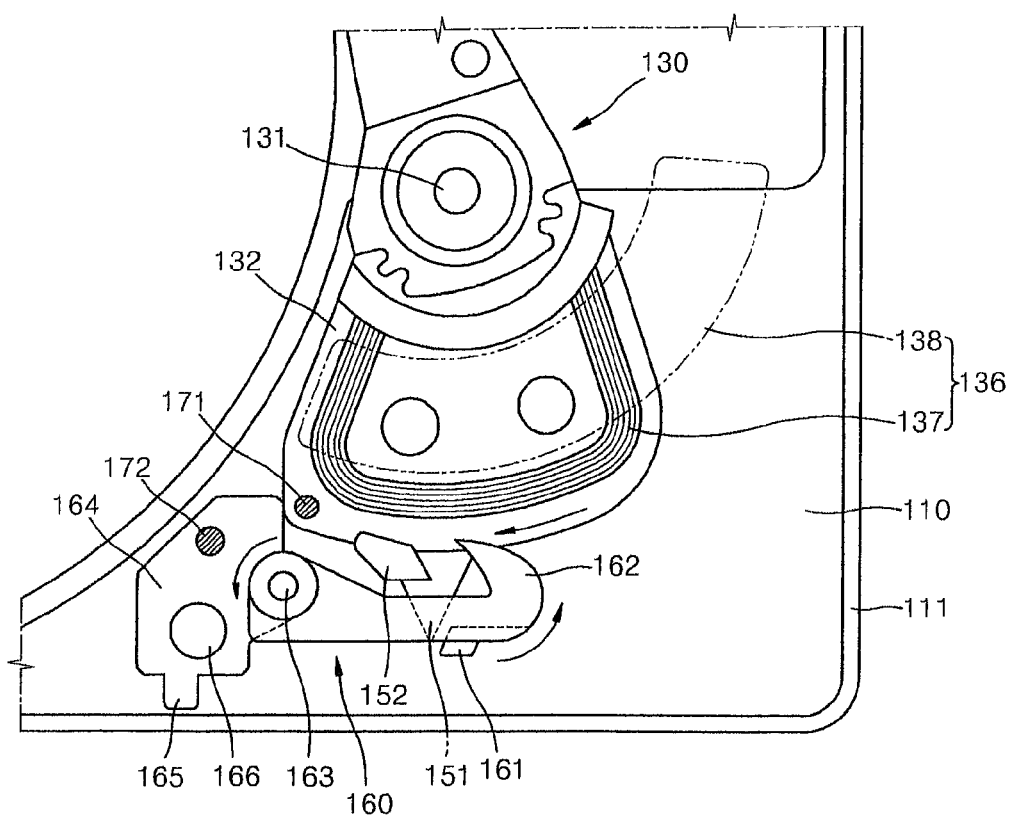
FIG. 7 is a plan view of the actuator latch system according to the present invention, in an equilibrium state of the HDD in which the HDD is undisturbed and the read/write head of the HDD is parked, and shows the actuator locked by the first protrusion and the first hook.

FIG. 7 shows the case in which the actuator is locked by the first protrusion 151 and the first hook 161 of the actuator latch system.

Referring to FIG. 7, the swing arm 132 is rotated clockwise about the central axis of the actuator pivot 131 by the VCM 136 when the HDD 100 is turned off and the read/write head mounted to the slider 134 is parked. At this time, the rear end portion of the swing arm 132 contacts the counterbalance 164 of the latch lever 160. The latch lever 160 is thus pushed by the swing arm 132 so as to rotate counterclockwise around the central axis of the latch pivot 163. As a result, the stopper 165 protruding from the counterbalance 164 of the latch lever 160 contacts the side wall 111 of the base 110, and thereby stops the latch lever 160 from rotating further in the counterclockwise direction.

At this time, the actuator 130 is locked in place, i.e., the latch lever system prevents the read/write head from moving toward the disk 120. In particular, the actuator 130 is fixed in place by the clockwise torque exerted on the swing arm 132 by the magnetic force of attraction between first iron core 171 and the magnet 138. As described above, the torque applied to the swing arm 132 is greater than that applied to the latch lever 160. Thus, the actuator 130 is reliably held in place, i.e., the locked state of actuator is reliably maintained.

However, the swing arm 132 is rotated counterclockwise due to its moment of inertia when an external force exerted on the HDD 100 produces a moment on the swing arm 132 that acts in the counterclockwise direction and is greater than the torque applied to the swing arm 132 due to the magnetic force of attraction between the first iron core 171 and the magnet 138. In this case, the first protrusion 151 of the swing arm 132 is caught by the first hook 161 of the latch lever 160. Thus, the swing arm 132 is prevented from rotating excessively in the counterclockwise direction while the read/write head is parked.

Contrast this to the case in which shock applied to the HDD 100 and transmitted to the swing arm 132 and the latch lever 160 creates moments in the clockwise direction. In this case, the swing arm 132 and the latch lever 160 will not rotate in the clockwise directions because the rear end portion of the swing arm 132 and the counterbalance 164 of the latch lever 160 are disposed in contact each other. Instead, the swing arm 132 rebounds from the latch lever 160 and thereby begins to rotate counterclockwise. However, the first protrusion 151 is caught by the first hook 161 of the latch lever 160. Thus, the counterclockwise rotation of the swing arm 132 is arrested.

As described above, the first protrusion 151 normally collides with the first hook 161 of the latch lever 160 when an external shock applied to the HDD while the read/write head is parked causes the swing arm 132 and the latch lever 160 to initially rotate counterclockwise. When the shock is considerably severe, the swing arm 132 and the latch lever 160 rebound and thereby begin to rotate clockwise. The swing arm 132 then collides with the counterbalance 164 of the latch lever 160. As a result of this collision, the swing arm 132 and the latch lever 160 each rotate for a second time in a counterclockwise direction.

Figure 8:
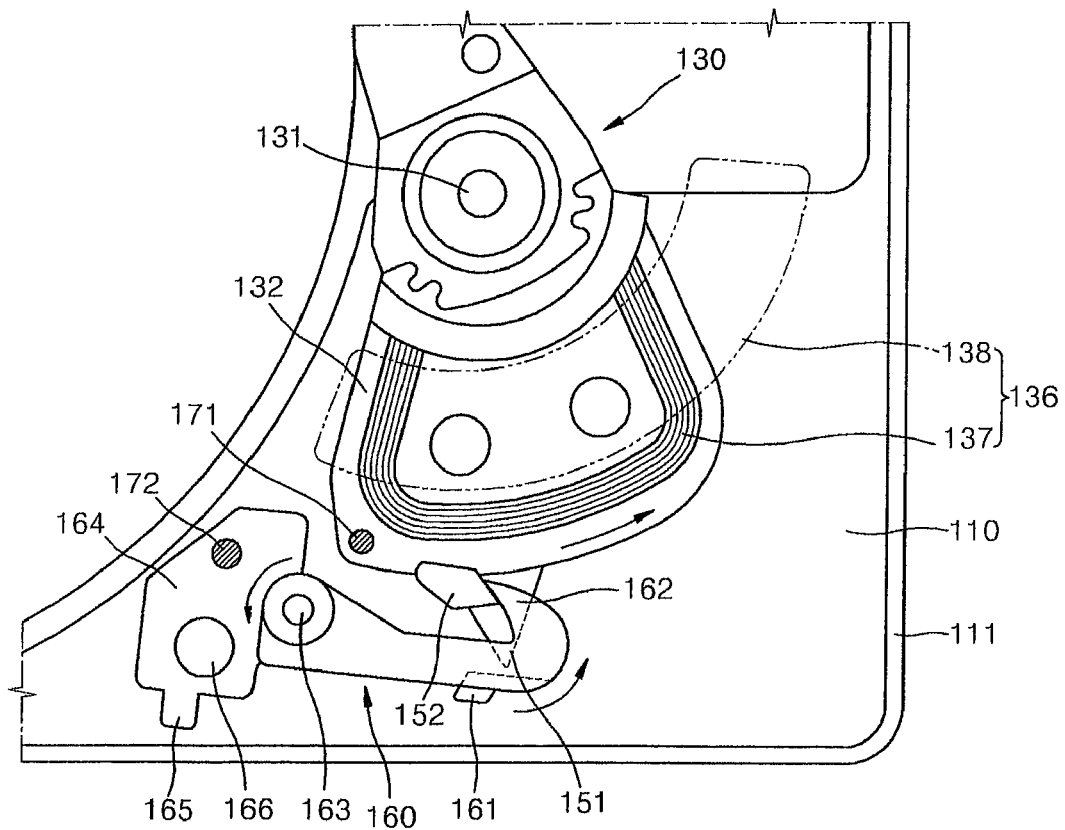
FIG. 8 is another plan view of the actuator latch system but shows the actuator locked by the second protrusion and the second hook.

As shown in FIG. 8, in this case, the first hook 161 of the latch lever 160 might not rotate into the path of the first protrusion 151. However, the second hook 162 of the latch lever 160 will be rotated into the path of the second protrusion 152. That is, the second protrusion 152 is caught by the second hook 162 so that the secondary counterclockwise rotation of the swing arm 132 is arrested.

Figure 9:
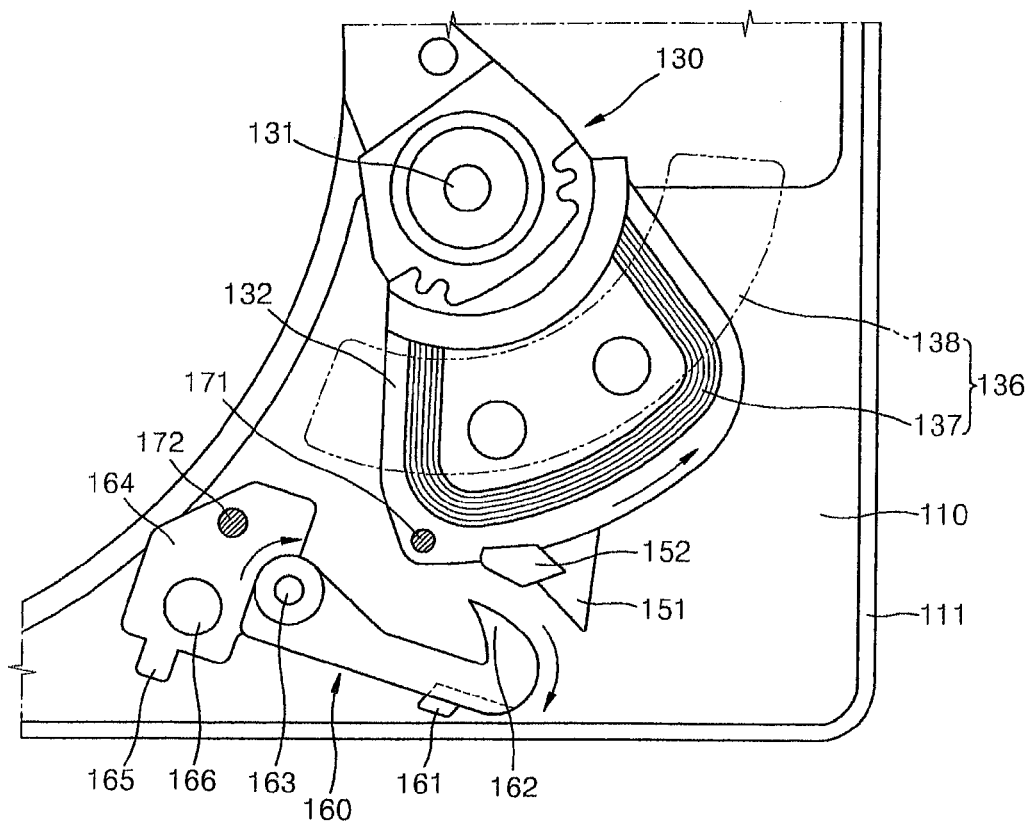
FIG. 9 is still another plan view of the actuator latch system and shows an operation of unlocking the actuator latch system.

FIG. 9 shows the "unlocking" of the actuator by the actuator latch system of the present invention. Referring to FIG. 9, when the HDD 100 is turned on, power is applied to the VCM coil 137 provided at the rear end portion of the swing arm 132. As a result, the swing arm 132 is rotated counterclockwise by a torque greater than that the torque applied to the swing arm 132 in the clockwise direction due to the force of attraction between the first iron core 171 and the magnet 138. Simultaneously, the latch lever 160 is rotated clockwise by the torque applied to the latch lever 160 due to the force of attraction between the second iron core 172 and the magnet 138. As a result, the first hook 161 and the second hook 162 of the latch lever 160 do not interfere with the movement of the first protrusion 151 and the second protrusion 152.

Finally, although the present invention has been particularly shown and described with reference to the preferred embodiments thereof, the present invention is not so limited. For example, although the present invention has been shown and described in connection with a hard disk drive employing a ramp loading type of parking system, the present invention could also be applied to hard disk drive employing a CSS type of parking system. Thus, various changes in form and details may be made to the preferred embodiments without departing from the true spirit and scope of the invention as defined by the appended claims.

What is claimed is:

1. In a hard disk drive kHDD) having a base, a disk having a recording surface, and an actuator mounted on the base so as to be rotatable about a first axis of rotation, the actuator including a swing arm having a front end at which a read/write head is supported, and a rear end disposed on an opposite side of the first axis of rotation from the front end,
   an actuator latch system that locks the actuator in a state in which the read/write head is parked when the HDD is not operating, the actuator latch system comprising:
   first and second protrusions each projecting from the rear end of the swing arm, the first and second protrusions having first and second engaging surfaces, respectively; and
   a latch lever mounted to the base so as to be freely rotatable about a second axis of rotation parallel to the first axis of rotation, the latch lever having a leading end, and first and second hooks disposed at upper and lower parts of the leading end, the first and second hooks having first and second engaging surfaces, respectively, and
   wherein the engaging surfaces of the first hook and first protrusion contact each other along a first interface when the swing arm is in a first relative rotational position, with respect to said first axis of rotation, while the HDD is in the state in which the read/write head is parked,
   the engaging surfaces of the second hook and second protrusion contact each other along a second interface when the swing arm is in a second relative rotational position, in which the swing arm is rotated about said first axis relative to said first relative rotational position, while the HDD is in the state in which the read/write head is parked, and
   the first and second interfaces are at different levels, in the HDD, in an orientation of the HDD in which the first and second axes of rotation extend vertically.

2. The actuator latch system in a hard disk drive as claimed in claim 1, wherein the engaging surfaces of the first hook and first protrusion face each other and the engaging surfaces of the second hook and second protrusion face each other in an equilibrium state of the HDD in which the HDD is undisturbed and the read/write head is parked, and
   the distance between the engaging surfaces of the second protrusion and the second hook is greater than the distance between the engaging surfaces of the first protrusion and the first hook in the equilibrium state of the HDD.

3. The actuator latch system in a hard disk drive as claimed in claim 1, wherein the engaging surfaces of the first hook and first protrusion face each other and the engaging surfaces of the second hook and second protrusion face each other in an equilibrium state of the HDD in which the HDD is undisturbed and the read/write head is parked, and
   the distance between the second hook and the axis of rotation of the swing arm is shorter than the distance between the first hook and the axis of rotation of the swing arm in the equilibrium state of the HDD.

4. The actuator latch system in a hard disk drive as claimed in claim 1, wherein the engaging surfaces of the first hook and the first protrusion are edges of the first hook and first protrusion, respectively, both disposed in a first plane perpendicular to the first and second axes of rotation, and
   the engaging surfaces of the second hook and the second protrusion are edges of the second hook and second protrusion, respectively, both disposed in a second plane parallel to the first plane, and
   the edges of the first protrusion and first hook are spaced relative to the edges of the second protrusion and second hook in said direction parallel to the first and second axes of rotation.

5. The actuator latch system in a hard disk drive as claimed in claim 4, wherein the rear end of the swing arm has a bottom surface that faces the base, an upper surface opposite the bottom surface and a side surface extending between the upper and bottom surfaces,
   the latch lever has a bottom surface that faces the base, the first protrusion protrudes, in a direction perpendicular to the first and second axes of rotation, from the side surface of the rear end of the swing arm, and
   the hook protrudes from the bottom surface of the latch lever.

6. The actuator latch system in a hard disk drive as claimed in claim 5, wherein the first protrusion is substantially triangular.

7. The actuator latch system in a hard disk drive as claimed in claim 4, wherein the second protrusion protrudes from the upper surface of the rear end of the swing arm and the second hook protrudes, in a direction perpendicular to the first and second axes of rotation, at the leading end of the latch lever.

8. The actuator latch system in a hard disk drive as claimed in claim 7, wherein part of the second protrusion protrudes, in a direction perpendicular to the first and second axes of rotation, outwardly beyond the side surface of the rear end of the swing arm.

9. The actuator latch system in a hard disk drive as claimed in claim 4, wherein the engaging surfaces of the first hook and first protrusion face each other and the engaging surfaces of the second hook and second protrusion face each other in an equilibrium state of the HDD in which the read/write head is parked, and
   the distance between the engaging surfaces of the second protrusion and the second hook is greater than the distance between the engaging surfaces of the first protrusion and the first hook in the equilibrium state of the HDD.

10. The actuator latch system in a hard disk drive as claimed in claim 9, wherein the engaging surfaces of the first hook and first protrusion face each other and the engaging surfaces of the second hook and second protrusion face each other in an equilibrium state of the HDD in which the read/write head is parked, and
    the distance between the second hook and the axis of rotation of the swing arm is shorter than the distance between the first hook and the axis of rotation of the swing arm in the equilibrium state of the HDD.

11. The actuator latch system in a hard disk drive as claimed in claim 4, wherein the engaging surfaces of the first hook and first protrusion face each other and the engaging surfaces of the second hook and second protrusion face each other in an equilibrium state of the HDD in which the read/write head is parked, and the distance between the second hook and the axis of rotation of the swing arm is shorter than the distance between the first hook and the axis of rotation of the swing arm in the equilibrium state of the HDD.

12. The actuator latch system in a hard disk drive as claimed in claim 1, further comprising a first iron core carried by the rear end of the swing arm.

13. The actuator latch system in a hard disk drive as claimed in claim 1, wherein the latch lever has a counterbalance at a rear end thereof, the rear end being disposed on an opposite side of the second axis of rotation from the leading end.

14. The actuator latch system in a hard disk drive as claimed in claim 13, further comprising a second iron core carried by the counterbalance of the latch lever.

15. The actuator latch system in a hard disk drive as claimed in claim 14, wherein the latch lever has a stopper protruding from the counterbalance toward a side wall of the base.

16. The actuator latch system in a hard disk drive as claimed in claim 15, wherein the counterbalance of the latch lever has a buffer hole extending therethrough adjacent the stopper.

17. The actuator latch system in a hard disk drive as claimed in claim 13, wherein the counterbalance contacts the swing arm in an equilibrium state of the HDD in which the HDD is undisturbed and the read/write head is parked.

18. The actuator latch system in a hard disk drive as claimed in claim 13, and in which hard disk drive a ramp is disposed radially outwardly of the disk, the actuator resting on the ramp in the state in which the read/write is parked.

19. In a hard disk drive (HDD) having a base, a disk having a recording surface, and an actuator mounted on the base so as to be rotatable about a first axis of rotation, the actuator including a swing arm having a front end at which a read/write head is supported, and a rear end disposed on an opposite side of the first axis of rotation from the front end, an actuator latch system that locks the actuator in a state in which the read/write head is parked when the HDD is not operating, the actuator latch system comprising:

first and second protrusions each projecting from the rear end of the swing arm; and a latch lever mounted to the base so as to be freely rotatable about a second axis of rotation parallel to the first axis of rotation, the latch lever having a leading end, and first and second hooks disposed at the leading end, and wherein the first hook and first protrusion face each other, with the first hook being ahead of the first protrusion in a predetermined direction of rotation about the first axis of rotation, when the HDD is in an equilibrium state in which the HDD is undisturbed while the read/write head is parked, the second hook and second protrusion face each other, with the second hook being ahead of the second protrusion in the predetermined direction of rotation, when the HDD is in the equilibrium state, the distance between the second protrusion and the second hook is greater than the distance between the first protrusion and the first hook in the equilibrium state of the HDD while the read/write head is parked, and the first hook and the first protrusion are collectively disposed relatively above or below the second hook and second protrusion in an orientation of the HDD in which the first and second axes of rotation extend vertically.

20. The actuator latch system in a hard disk drive as claimed in claim 19, wherein the distance between the second hook and the axis of rotation of the swing arm is shorter than the distance between the first hook and the axis of rotation of the swing arm in the equilibrium state of the HDD.

* * * * *